(12) United States Patent
Overby

(10) Patent No.: US 7,450,027 B1
(45) Date of Patent: Nov. 11, 2008

(54) METHOD AND SYSTEM FOR IMPLEMENTING A SERIAL ENCLOSURE MANAGEMENT INTERFACE FOR A COMPUTER SYSTEM

(75) Inventor: Mark A. Overby, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 288 days.

(21) Appl. No.: 11/494,756

(22) Filed: Jul. 26, 2006

(51) Int. Cl.
G08B 5/00 (2006.01)

(52) U.S. Cl. .............................. 340/815.4; 340/815.45; 340/815.5; 340/815.69; 711/170; 711/202; 711/203; 711/207

(58) Field of Classification Search ............. 340/815.4, 340/815.43, 815.44, 815.45, 815.46, 815.5, 340/815.54, 815.69; 395/600, 650; 711/170, 711/202, 203, 207
See application file for complete search history.

(56) References Cited

U.S. PATENT DOCUMENTS

2003/0177332 A1* 9/2003 Shiota .................... 711/203

* cited by examiner

Primary Examiner—Hung T. Nguyen
(74) Attorney, Agent, or Firm—Patterson & Sheridan, LLP

(57) ABSTRACT

A method and system for implementing a serial enclosure management interface is disclosed. In one embodiment, the LED indicators for a storage device in an external enclosure are managed. First, a set of bit patterns for driving the LED indicators is repeatedly placed on a serial bus that is connected to an external enclosure for transmission by varying the states of the serial bus. This process continues until a change to this set of bit patterns is detected. In one embodiment, the change is captured in a memory mapped register, which is typically accessible by a storage device controller. The detected change prompts accesses to a virtualized register, which generally resides in system memory, to generate a different set of bit patterns to place on the serial bus.

20 Claims, 6 Drawing Sheets

METHOD AND SYSTEM FOR IMPLEMENTING A SERIAL ENCLOSURE MANAGEMENT INTERFACE FOR A COMPUTER SYSTEM

BACKGROUND OF THE INVENTION

1. Field of the Invention

Embodiments of the present invention relate generally to management of external enclosures and more specifically to implementing a serial enclosure management interface for a computer system.

2. Description of the Related Art

Unless otherwise indicated herein, the approaches described in this section are not prior art to the claims in this application and are not admitted to be prior art by inclusion in this section.

The mass storage of a computer system, especially a server system, sometimes resides in an external enclosure for reasons such as redundancy, security, and expandability. FIG. 1A is a conceptual diagram of a computer system connecting to such an external storage unit. Specifically, computer system 100 includes at least one Serial Attached Small Computer System Interface ("SAS") and/or Serial Advanced Technology Attachment ("SATA") controller 102, which provides point-to-point connections between computer system 100 and the hard drives in external enclosure 104, such as hard drives 110 and 112, via SAS/SATA cables. SAS/SATA controller 102 also supports a serialized general purpose input output ("SG-PIO") interface that is compliant with the SFF-8485 specification. This SGPIO interface enables computer system 100 to interact with external enclosure 104 with respect to light emitted diode ("LED") control, device information, and other general purpose data relating to the hard drives. In particular, SAS/SATA controller 102 sends certain bit patterns to an LED management component of external enclosure 104, such as SGPIO controller 108 on printed circuit board ("PCB") 106, to drive the LEDs of hard drives 110 and 112. As is well-known, the bit patterns correspond to certain pre-defined conditions of the hard drives 110 and 112, such as the configuration and activity, the identification and the operability of the drives. The current operating condition of the drives is thus reflected by the LED display associated with each drive. It is worth noting that the number of SGPIO interfaces that SAS/SATA controller 102 supports is fixed and cannot be expanded without hardware modifications.

FIG. 1B is a conceptual diagram of the SGPIO bus discussed above, which carries four types of signals: SClock, SLoad, SDataOut, and SDataIn. An initiator, in this case SAS/SATA controller 102, sends the aforementioned bit patterns to target, in this case SGPIO controller 108, via the SDataOut signal. More specifically, pursuant to the SFF-8485 specification, SAS/SATA controller 102 serially and continuously transmits 3-bit patterns for each of the hard drives in external enclosure 104. Thus, there is a first 3-bit pattern for hard drive 110, a second 3-bit pattern for hard drive 112, etc. After SAS/SATA controller 102 transmits the last 3-bit pattern to the last hard drive in external enclosure 104, SAS/SATA controller 102 starts transmitting the first 3-bit pattern to hard drive 110 again. The device driver for SAS/SATA controller 102 generally uses the "bit-banging" technique to emulate a serial communication interface and place the aforementioned bit patterns on the SGPIO bus. However, this software implementation generally incurs significant CPU overhead by frequently resetting and reloading bit patterns and generating interrupts, thereby reducing overall system performance.

As the foregoing illustrates, what is needed is a more efficient approach to managing the bit patterns transmitted to storage devices residing in an external enclosure in a computer system.

SUMMARY OF THE INVENTION

A method and system for implementing a serial enclosure management interface is disclosed. In one embodiment, the LED indicators for a storage device in an external enclosure are managed. First, a set of bit patterns for driving the LED indicators is repeatedly placed on a serial bus that is connected to an external enclosure for transmission by varying the states of the serial bus. This process continues until a change to this set of bit patterns is detected. In one embodiment, the change is captured in a memory mapped register, which is typically accessible by a storage device controller. The detected change prompts accesses to a virtualized register, which generally resides in system memory, to generate a different set of bit patterns to place on the serial bus.

One advantage of the disclosed method and system is that they provide a way to utilize a serial interface microcontroller to transmit bit patterns to drive LED indicators and avoid the overhead of employing software approaches, such as a bit-banging technique.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and system for implementing a serial enclosure management interface is described. In the following description, for the purposes of explanation, numerous specific details are set forth in order to provide a thorough understanding of the present invention. It will be apparent, however, to one skilled in the art that the present invention may be practiced without these specific details. In addition, certain interface and interconnect specifications are well known in the art and will not be elaborated in detail.

Figure 1A:
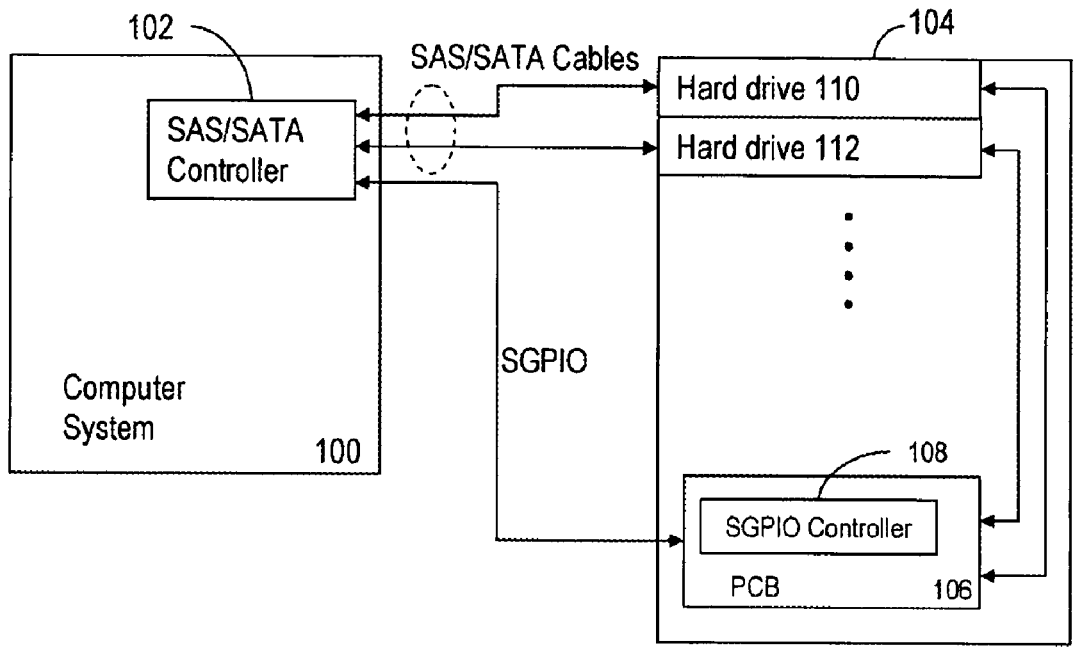
FIG. 1A is a conceptual diagram of a computer system connecting to an external storage unit.
Figure 1B:
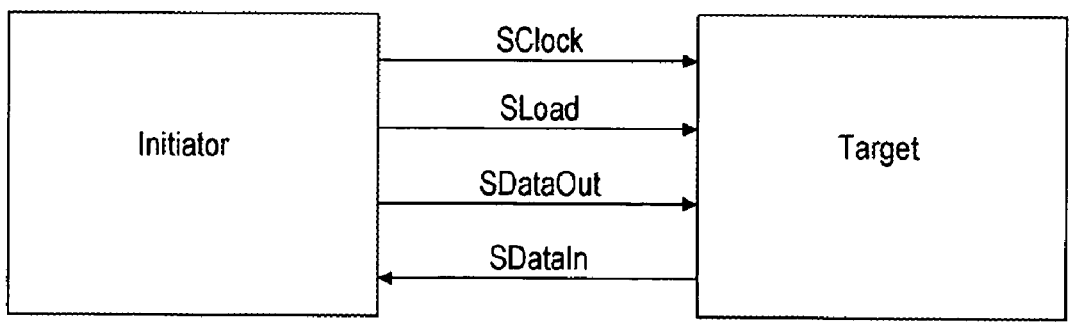
FIG. 1B is a conceptual diagram of an serial general purpose input output bus.
Figure 2:
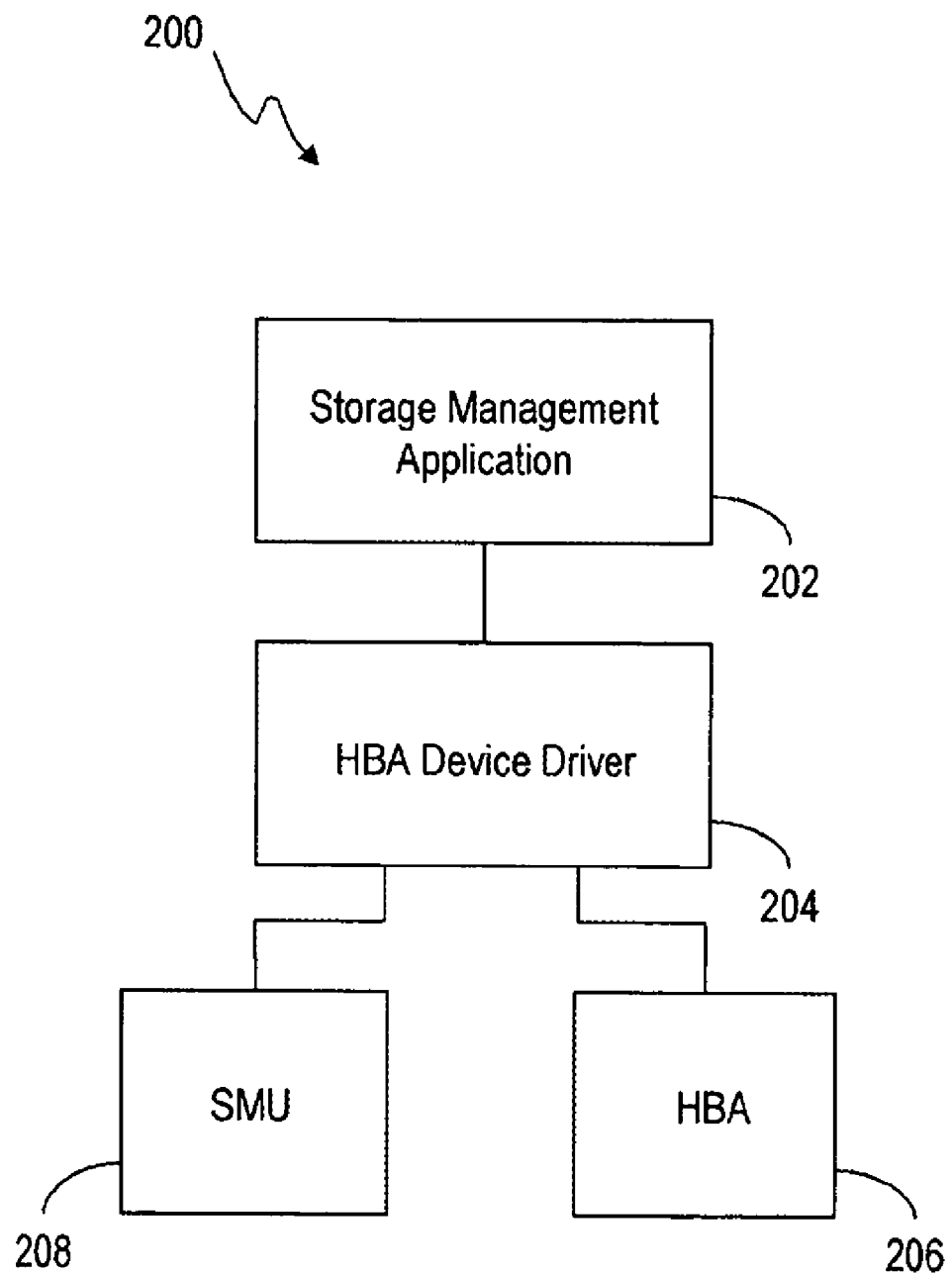
FIG. 2 is a conceptual diagram of the components of a serial management interface between a computer system and an external enclosure, according to one embodiment of the present invention.

FIG. 2 is a conceptual diagram of the components of a serial management interface between a computer system and an external enclosure, according to one embodiment of the present invention. Specifically, management interface 200 includes storage management application 202, host bus adapter ("HBA") device driver 204, HBA 206, and system management unit ("SMU") 208. Storage management application 202 generally refers to application software that runs on top of the operating system in a computer system, and this application software enables the computer system to manage an external enclosure containing one or more storage devices. HBA device driver 204 generally refers to software that enables storage management application 202 and also the aforementioned operating system to interact with HBA 206. In one implementation, HBA 206 follows the SATA protocol. SMU 208 is a microcontroller, which supports the functionalities of a SGPIO controller and also enables a platform trapping mechanism, which is described in greater detail in subsequent paragraphs. In operation, storage management application 202 sends SCSI Management Protocol ("SMP") messages to HBA device driver 204. Upon receipt of the messages, HBA device driver 204 updates a memory block that correspond to a set of SGPIO registers for SMU 208. This memory block is referred to as "virtualized SGPIO registers" or "virtualized SGPIO register set" throughout this disclosure, because both HBA device driver 204 and storage management application 202 access the memory block as if it were identical to the SGPIO register set.

Figure 3:
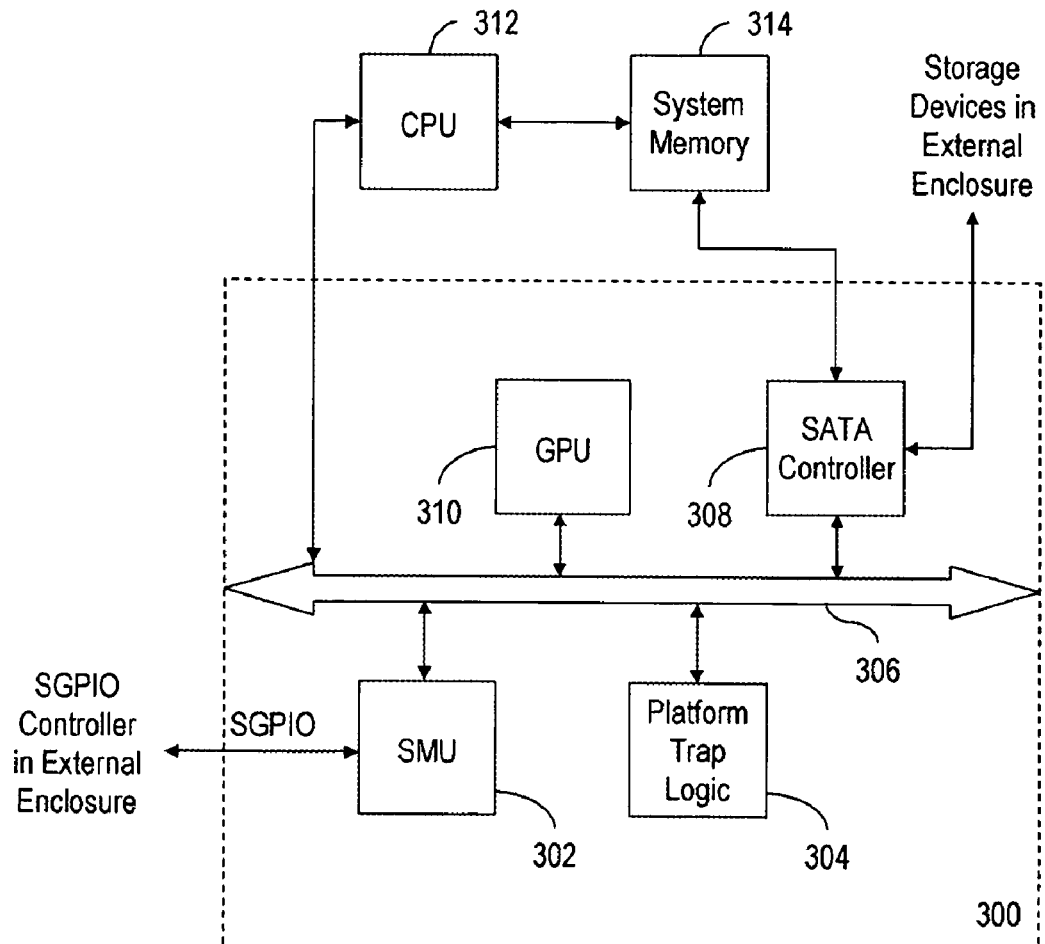
FIG. 3 is a conceptual diagram of a media and communications processor, according to one embodiment of the present invention.

FIG. 3 is a conceptual diagram of media and communications processor ("MCP") 300, which contains HBA 206 and SMU 208, shown in FIG. 2 and discussed above. Specifically, one embodiment of MCP 300 includes at least system management unit ("SMU") 302, platform trap logic 304, internal bus 306, SATA controller 308, and optionally graphics processing unit ("GPU") 310. SATA controller 308 is a particular type of HBA 206. MCP 300 generally resides in a computer system or an embedded system and connects to CPU 312 and system memory 314. Alternatively, MCP 300 could connect to CPU 312 and system memory 314 via a bridge chip and potentially also an interconnect bus, such as, without limitation, peripheral component interconnect ("PCI") and PCI-X. SMU 302 is mainly responsible for communicating with the SGPIO controller of an external enclosure. Platform trap logic 304 intercepts and examines certain transactions on internal bus 306, such as requests issued by CPU 312 to write data to particular physical memory locations, as described in greater detail herein. In certain situations, platform trap logic 304 redirects the transactions to SMU 302 for additional processing. SATA controller 308 sets aside a set of registers to access the hard drives in an external enclosure. These registers are mapped to memory locations in system memory 314.

Figure 4:
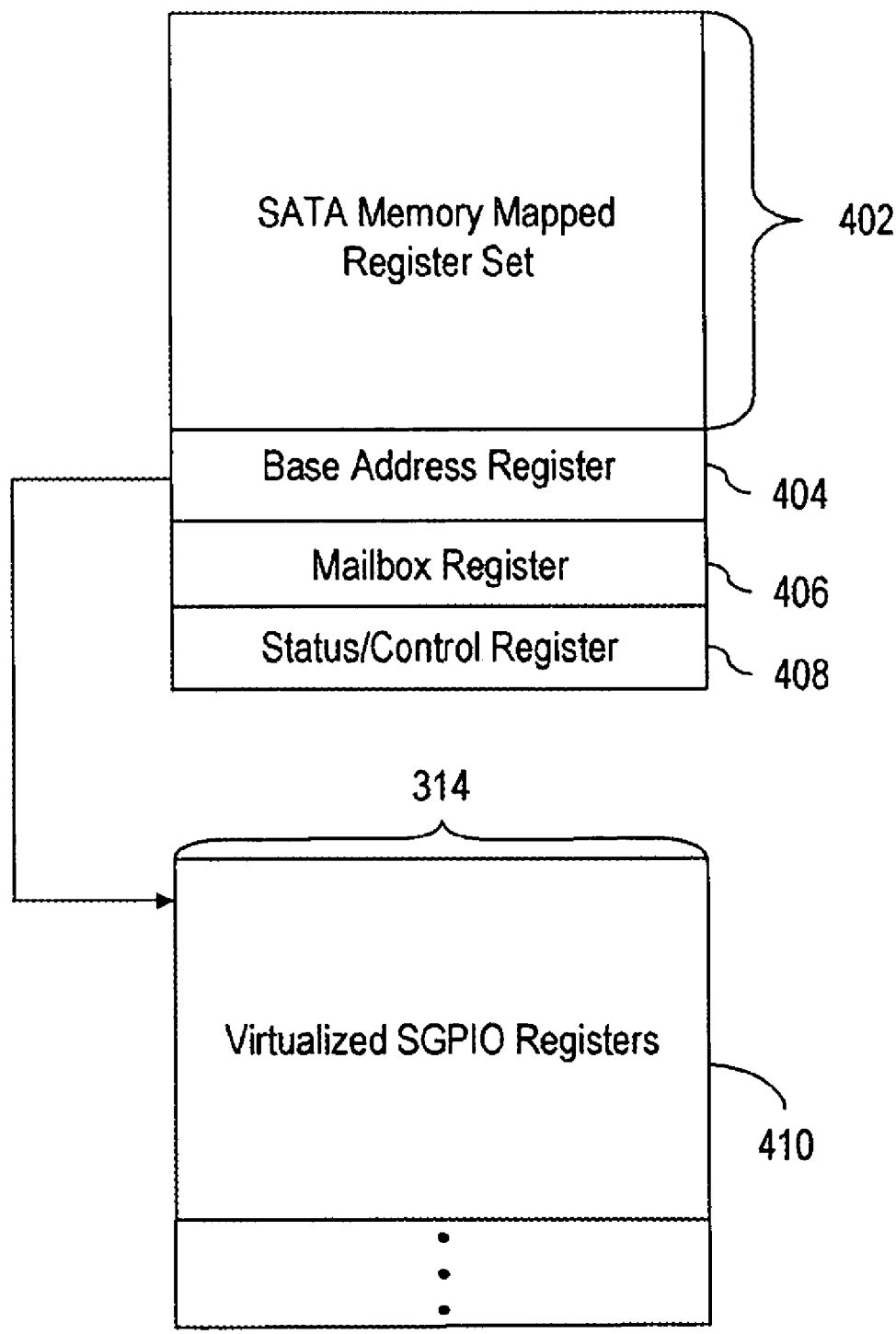
FIG. 4 illustrates an extended SATA memory mapped register set.

FIG. 4 illustrates an extended SATA memory mapped register set. In one implementation, section 402 represents a set of memory mapped registers for HBA 206, such as SATA controller 308, shown in FIG. 3. SATA controller 308 may also adhere to the Advanced Host Controller Interface ("AHCI") specification for enclosure management. According to one embodiment of the present invention, section 402 is extended to include three additional memory mapped registers for SMU 302. They are base address register 404, mailbox register 406, and status/control register 408. Base address register 404 contains the base address for virtualized SGPIO registers 410, which reside in system memory 314 of a computer system. Mailbox register 406 enables a message passing mechanism between SATA controller 308 and SMU 302. Subsequent paragraphs will further detail this mechanism. Status/control register 408 contains status information such as, without limitation, initialization status of SMU 302, and control information, such as, without limitation, the transmission bit rate for SMU 302 and requested actions to stop, reset, or restart SMU 302.

Figure 5A:
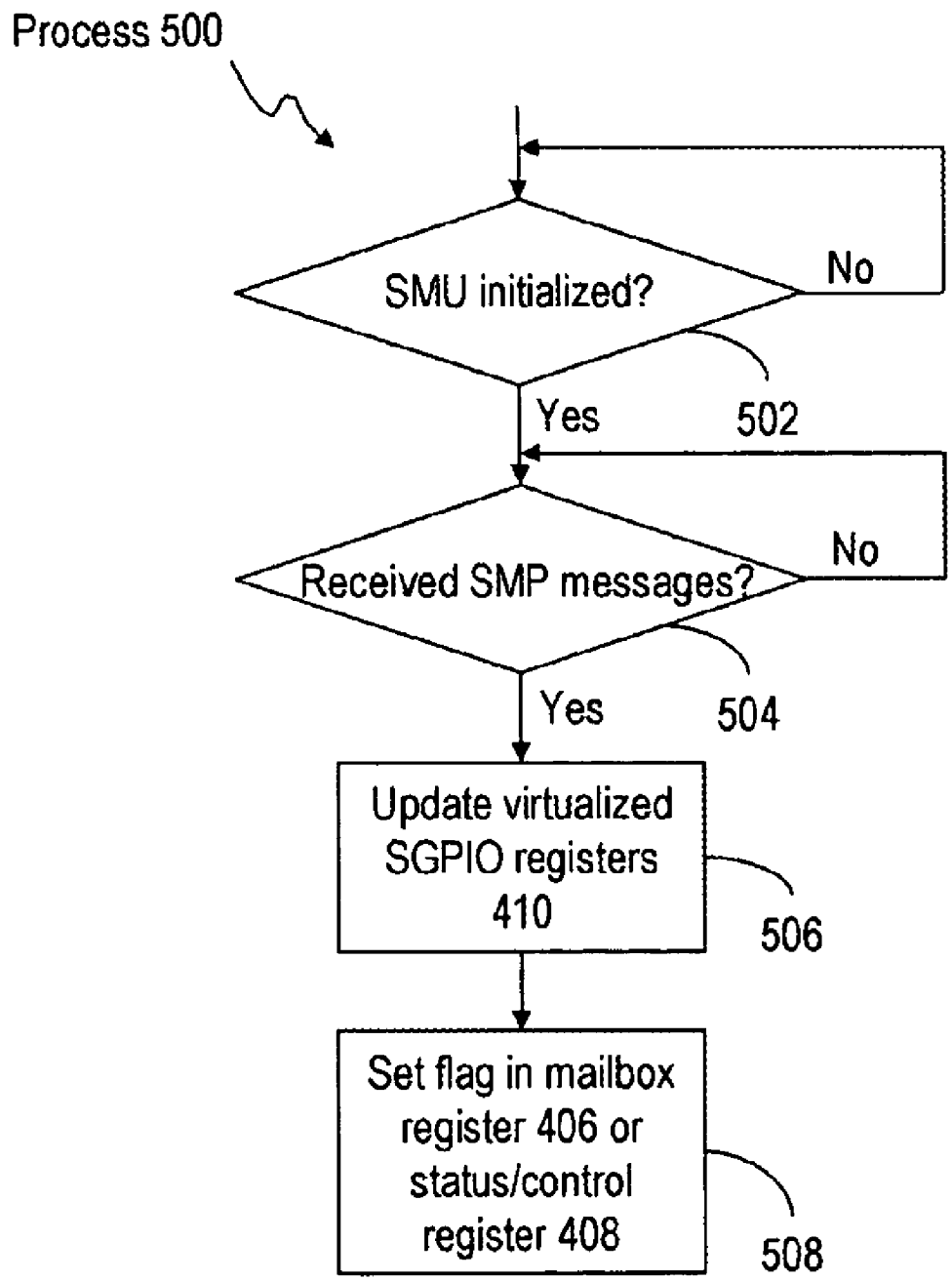
FIG. 5A is a flow diagram of one process that a HBA device driver follows to facilitate a message passing mechanism.

FIG. 5A is a flow diagram of one process, process 500, that HBA device driver 204 as shown in FIG. 2 or a device driver for SATA controller 308 as shown in FIG. 3 follows to facilitate the aforementioned message passing mechanism, according to one embodiment of the present invention. Using MCP 300 shown in FIG. 3 as an illustration, the device driver for SATA controller 308 ensures SMU 302 completes its initialization in step 502 by checking the information maintained in status/control register 408 as shown in FIG. 4. Then the device driver for SATA controller 308 awaits SMP messages in step 504 from storage management application, which is executed by CPU 312. For management of the LED indicators of an external enclosure, these SMP messages include information relating to activity indicator, locate indicator, and error indicator for each hard drive in the external enclosure. In step 506, the device driver for SATA controller 308 extracts information from the SMP messages and writes the information to the appropriate memory locations in virtualized SGPIO registers 410. For example, in one implementation, pursuant to the SFF-8485 specification, the recommended bit patterns that are representative of various combinations of the three aforementioned LED indicators are written to the GPIO transmit registers, which, according to one embodiment of the present invention, are a part of virtualized SGPIO registers 410 in system memory 314. The device driver for SATA controller 308 then sets a flag in mailbox register 406 in step 508 to indicate that certain content in virtualized SGPIO registers 410 has been modified.

Alternatively, instead of writing the recommended bit patterns to virtualized SGPIO registers 410, the storage management application and the device driver for SATA controller 308 may cause human-readable requests for such bit patterns to be stored in virtualized SGPIO registers 410. The device driver for SMU 302 then, in effect, provides an abstraction layer by translating the requests into the recommended bit patterns and placing the translated bit patterns on the SGPIO bus. It should be apparent to one with ordinary skill in the art to utilize various translation methods, such as, without limitation, the use of one or more look-up tables or libraries without exceeding the scope of the claimed invention.

In addition to setting a flag in mailbox register 406 as discussed above, the storage management application may also send SMP messages to the device driver for SATA controller 308 to modify the content of status/control register 408 in step 508. For example, the storage management application may wish to stop, reset, or restart the operations of SMU 302 by sending SMP messages that contain such control information to the device driver for SATA controller 308 via internal bus 306. A platform trapping mechanism, enabled by platform trap logic 304, intercepts such messages intending for SATA controller 308 and status/control register 408 and redirects the messages to SMU 302 for processing. Subsequent paragraphs will further describe the platform trapping mechanism. SMU 302 then examines the intercepted messages, carries out the requested actions, such as stopping, resetting, or restarting its current operations, and sets appropriate bits in status/control register 408.

Figure 5B:
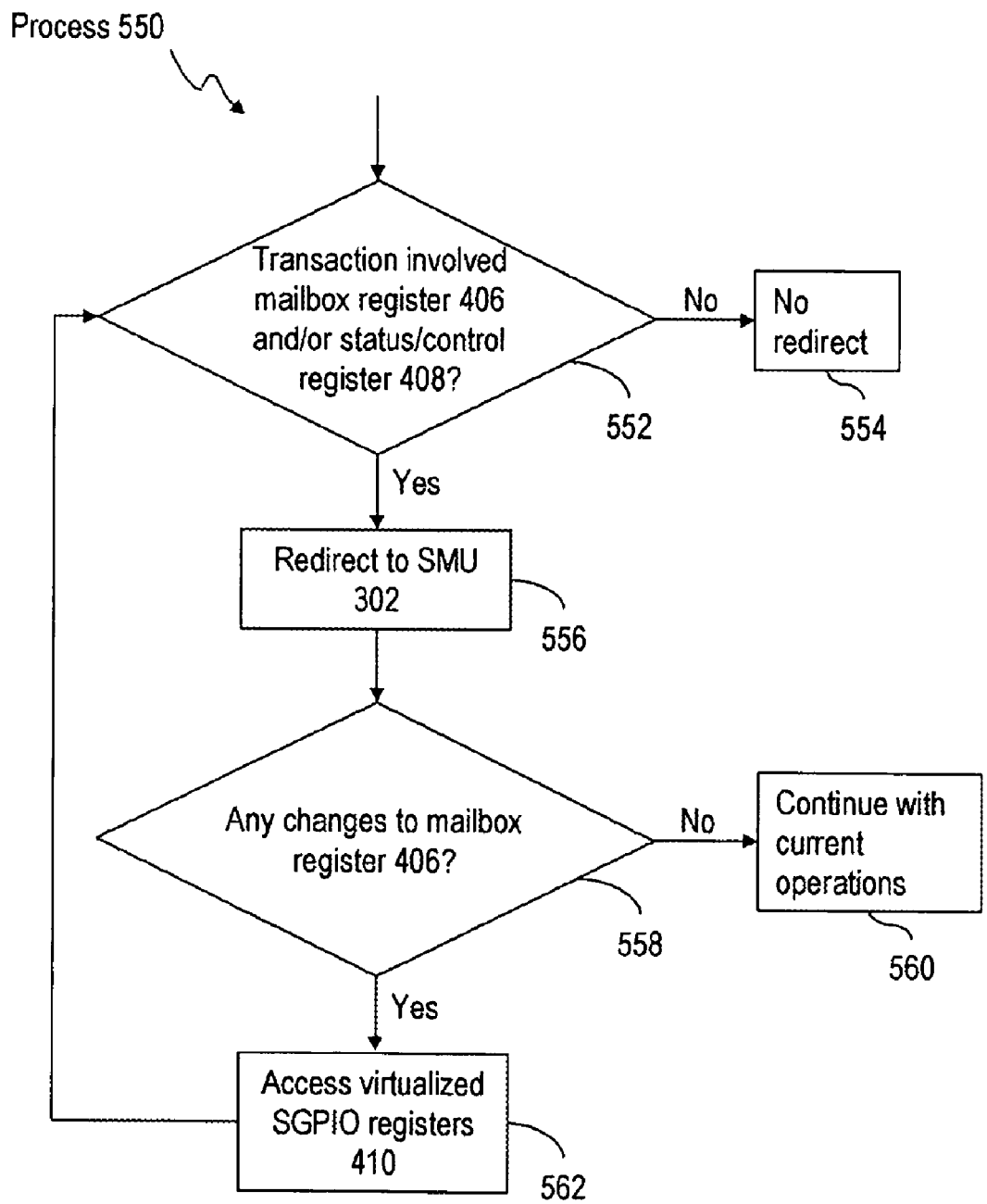
FIG. 5B is a flow diagram illustrating a platform trapping process, according to one embodiment of the present invention.

More specifically, FIG. 5B is a flow diagram illustrating a platform trapping process, process 550, according to one embodiment of the present invention. Specifically, platform trap logic 304 as shown in FIG. 3 monitors internal bus 306 for transactions that are intended for the device driver for SATA controller 308 in step 552. If any of these transactions involves a read or write access to any of the memory locations corresponding to mailbox register 406 and status/control register 408, then platform trap logic 304 "traps" and redirects this transaction to SMU 302 in step 556. As discussed above, SMU 302 may carry out the requests contained in the transaction and modify status/control register 408 accordingly. In step 558, SMU 302 also checks whether the flag in mailbox register 406 has been set to indicate, for example, a change in the bit patterns that drive the LED indicators of an external enclosure. If the flag is set, then SMU 302 accesses virtualized SGPIO registers 410 in step 562 using at least the base address in base address register 404 and retrieves the updated bit patterns or the human-readable requests for the updated bit patterns.

In one implementation, SMU 302 relies on an internal clock provided by MCP 300 to transmit the bit patterns derived from virtualized SGPIO registers 410 by changing the states of each wire on the SGPIO bus in response to the edges of this internal clock. SMU 302 repeats the bit patterns for the hard drives in an external enclosure until SMU 302 detects a state change in mailbox register 406. To detect this state change, in one implementation, the device driver for SMU 302 periodically polls mailbox register 406. Alternatively, the device driver for SATA controller 308 generates an interrupt indicative of a change in mailbox register 406.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

I claim:

1. A system for controlling LED indicators for a storage device in an external enclosure, comprising:
   an internal bus;
   a memory module;
   a storage device controlling means for managing accesses to said storage device and coupled to said internal bus and said memory module; and
   a serial interface controlling means coupled to said internal bus for repeatedly placing a first set of bit patterns for driving said LED indicators on a serial bus to said external enclosure, wherein
   in response to detecting said storage device controlling means for setting a flag in a first memory mapped register, said serial interface controlling means accesses a virtualized register in said memory module to generate a second set of bit patterns to place on said serial bus.

2. The system of claim 1, wherein said storage device controlling means maintains memory address information for said virtualized register in a second memory mapped register.

3. The system of claim 2, wherein status information or control information for said serial interface controlling means is stored in a third memory mapped register, which is accessible by said storage device controlling means.

4. The system of claim 3, further comprising a platform trapping means, coupled to said internal bus, for redirecting any transaction that accesses any of said first memory mapped register and said third memory mapped register to said serial interface controlling means.

5. The system of claim 1, wherein said storage device controlling means stores data relating to said second set of said bit patterns in said virtualized register prior to setting said flag in said first memory mapped register.

6. The system of claim 5, wherein said data relating to said second set of said bit patterns are human-readable requests.

7. The system of claim 6, wherein said serial interface controlling means translates said human-readable requests to said second set of said bit patterns.

8. A system for controlling LED indicators for a storage device in an external enclosure, comprising:
   an internal bus;
   a memory module;
   a processor coupled to said internal bus and said memory module;
   a storage device controller coupled to said internal bus and said memory module; and
   a serial interface controller coupled to said internal bus, wherein
   said serial interface controller repeatedly places a first set of bit patterns for driving said LED indicators on a serial bus to said external enclosure until said storage device controller sets a flag in a first memory mapped register, which causes said serial interface controller to access a virtualized register in said memory module to generate a second set of bit patterns to place on said serial bus.

9. The system of claim 8, wherein said storage device controller maintains memory address information for said virtualized register in a second memory mapped register.

10. The system of claim 9, wherein status information or control information relating to said serial interface controller is stored in a third memory mapped register, which is accessible by said storage device controller.

11. The system of claim 10, further comprising a platform trapping logic, coupled to said internal bus, which redirects any transaction that accesses any of said first memory mapped register and said third memory mapped register to said serial interface controller.

12. The system of claim 8, wherein said storage device controller stores data relating to said second set of said bit patterns in said virtualized register prior to setting said flag in said first memory mapped register.

13. The system of claim 12, wherein said data relating to said second set of said bit patterns are human-readable requests.

14. The system of claim 13, wherein said serial interface controller translates said human-readable requests to said second set of said bit patterns.

15. A method for controlling LED indicators for a storage device in an external enclosure, comprising:
   repeatedly placing a first set of bit patterns for driving said LED indicators on a serial bus to said external enclosure by changing a plurality of states associated with said serial bus;
   detecting a change to said first set of said bit patterns; and
   in response to said change, accessing a virtualized register to generate a second set of bit patterns to place on said serial bus.

16. The method of claim 15, further comprising the step of representing said change by setting a flag in a first memory mapped register.

17. The method of claim 16, further comprising the step of maintaining memory address information for said virtualized register in a second memory mapped register.

18. The method of claim 17, further comprising the steps of identifying and redirecting any transaction that accesses said first memory mapped register.

19. The method of claim 16, further comprising the step of storing data relating to said second set of said bit patterns in said virtualized register prior to setting said flag in said first memory mapped register.

20. The method of claim 19, further comprising the step of converting said data relating to said second set of said bit patterns into said second set of said bit patterns.

* * * * *